United States Patent
Liu et al.

(10) Patent No.: US 12,541,221 B2
(45) Date of Patent: Feb. 3, 2026

(54) LOW LATENCY GEARBOX RETIMER ARCHITECTURE

(71) Applicant: Avago Technologies International Sales Pte. Limited, Singapore (SG)

(72) Inventors: Chang Liu, Irvine, CA (US); Xiaoliang Li, Irvine, CA (US); Boyu Hu, Irvine, CA (US); Delong Cui, Tustin, CA (US); Jun Cao, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 34 days.

(21) Appl. No.: 18/649,933

(22) Filed: Apr. 29, 2024

(65) Prior Publication Data

US 2025/0334995 A1 Oct. 30, 2025

(51) Int. Cl.
*G06F 1/08* (2006.01)
*H03M 1/12* (2006.01)

(52) U.S. Cl.
CPC ............ *G06F 1/08* (2013.01); *H03M 1/1215* (2013.01)

(58) Field of Classification Search
CPC ..... G06F 1/04; G06F 1/08; G06F 1/10; G06F 1/06; G06F 1/12
See application file for complete search history.

(56) References Cited

U.S. PATENT DOCUMENTS

| | | | |
|---|---|---|---|
| 11,916,561 B1* | 2/2024 | Hu | H03M 1/0624 |
| 2022/0140837 A1* | 5/2022 | Xu | H03M 1/121 |
| | | | 341/161 |
| 2022/0197330 A1* | 6/2022 | Xavier | H03L 7/0818 |
| 2022/0302921 A1* | 9/2022 | Dyer | G06F 18/214 |

OTHER PUBLICATIONS

Extended European Search Report, European Application No. 25172809.3 dated Sep. 30, 2025, 14 pages.
Benhammadi Seddik et al.: "Precise: A 5Gbps Serialiser for Scientific Detectors in a 180nm CMOS Image Sensor Process", 2022 IEEE Nuclear Science Symposium and Medical Imaging Conference (NSS/MIC), IEEE, Nov. 5, 2022, pp. 1-8, XP034528795, DOI: 10.1109/NSS/MIC44845.2022.10399290 [retrieved on Jan. 26, 2024], 8 pages.

(Continued)

*Primary Examiner* — Raymond N Phan
(74) *Attorney, Agent, or Firm* — King Intellectual Asset Management

(57) ABSTRACT

A low latency gearbox retimer architecture is provided. An apparatus includes a first clock generator configured to generate a first clock signal having a first frequency, and a second clock signal having a second frequency. A control logic is configured to generate the control signal, based, at least in part, on the second clock signal, and two or more analog to digital converter (ADC) slices. Each respective ADC slice includes a multiplexer having a first number of inputs and a second number of outputs, wherein the multiplexer is configured to select a set of the second number of inputs to be output, wherein the set of the second number of inputs selected is based, at least in part, on a control signal. The apparatus includes one or more unit-ADCs, wherein the respective outputs of the one or more unit-ADCs are coupled to the multiplexer as an input.

20 Claims, 5 Drawing Sheets

(56) References Cited

OTHER PUBLICATIONS

Ruan Weihua et al.: "A 0.18 [mu]m CMOS transmit physical coding sublayer IC for 100G Ethernet", Journal of Semiconductors, vol. 37, No. 3, Mar. 1, 2016, p. 035005, XP093317021, GB; CN ISSN: 1674-4926, DOI: 10.1088/1674-4926/37/3/035005 Retrieved from the Internet: URL: https://iopscience.iop.org/article/10.1088/1674-4926/37/3/035005/pdf , 8 pages.

* cited by examiner

LOW LATENCY GEARBOX RETIMER ARCHITECTURE

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for a retimer in analog to digital converter (ADC) and digital signal processor (DSP) interface serializer/deserializer (SerDes) chips.

BACKGROUND

Time interleaved (TI) successive approximation register (SAR) ADCs form core building blocks of a larger ADC/digital signal processor (DSP) based serializer/deserializer (SerDes) core, acting as the interface between the analog frontend (AFE) and the DSP core. The ADC provides multi-way interleaved data as well as a clock signal to the DSP.

Traditional ADC retimer and DSP interface structures utilize a plurality of unit-ADCs, each running at a respective clock rate. The interleaved ADC data is aligned by the ADC data alignment block, which functions as a retimer (also referred to simply as the "retimer"). The retimer transmits the aligned data (e.g., combined data from the multiplexer outputs) as well as a combined clock (e.g., 32T clock) to the DSP. In this arrangement, the DSP operates at the same clock as the sampling clock of the unit-ADC, resulting in suboptimal power consumption (e.g., high power consumption or degradation to clock-data-recovery (CDR) performance) due to differences in optimal clock speeds for the DSP and unit-ADCs.

Thus, a gearbox retiming circuit for a TI-ADC/DSP SerDes core is provided.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF EMBODIMENTS

Figure 1:
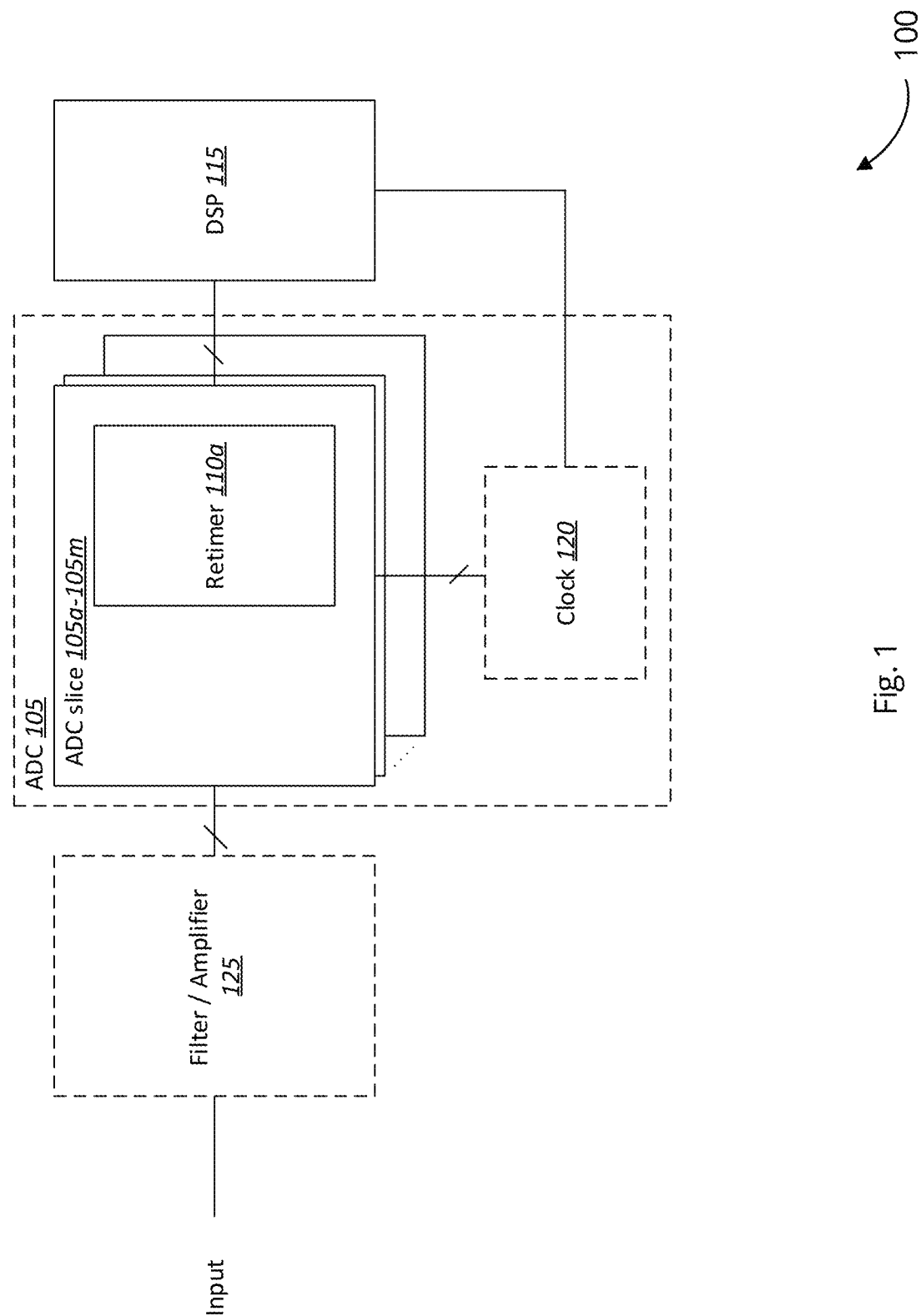
FIG. 1 is a schematic block diagram of a DSP system with a gearbox retimer, in accordance with various embodiments.

Various embodiments set forth an architecture for an ADC with a gearbox retimer.

In some embodiments, an apparatus includes a first clock generator configured to generate a first clock signal having a first frequency, and a second clock signal having a second frequency, wherein the first clock signal and second clock signal are generated based on a third clock signal having a third frequency, and a control logic configured to generate the control signal, based, at least in part, on the second clock signal. The apparatus further includes two or more ADC slices, each respective ADC slice comprising a multiplexer having a first number of inputs and a second number of outputs, wherein the multiplexer is configured to select a set of the second number of inputs to be output, wherein the set of the second number of inputs selected is based, at least in part, on a control signal. A second clock generator may be coupled to the first clock generator, the second clock generator configured to generate one or more fourth clock signals based, at least in part, on the first clock signal, each of the one or more fourth clock signals having a second frequency. The apparatus further includes one or more unit-ADCs coupled to the second clock generator, each unit-ADC configured to receive a respective fourth clock signal of the one or more fourth clock signals, and wherein the respective outputs of the one or more unit-ADCs are coupled to the multiplexer as an input.

In further embodiments, a circuit for a gearbox retimer is provided. The circuit includes a clock generator configured to generate a first clock signal having a first frequency, and a second clock signal having a second frequency, wherein the first clock signal and second clock signal are generated based on a third clock signal having a third frequency, and a multiplexer having a first number of inputs and a second number of outputs, wherein the multiplexer is configured to select a set of the second number of inputs to be output, wherein the set of the second number of inputs selected is based, at least in part, on a control signal. The circuit may include a control logic configured to generate the control signal, based, at least in part, on the second clock signal, and one or more unit-ADCs. Each unit-ADC may be configured to receive a respective fourth clock signal of one or more fourth clock signals, wherein the one or more fourth clock signals are generated based, at least in part, on the first clock signal, and wherein the respective outputs of the one or more unit-ADCs are coupled to the multiplexer as an input.

In further embodiments, a system for a TI-ADC architecture with gearbox retimer is provided. The system includes an ADC, which may further include a first clock generator, control logic, two or more ADC slices, and a retimer. The first clock generator may be configured to generate a first clock signal having a first frequency, and a second clock signal having a second frequency, wherein the first clock signal and second clock signal are generated based on a third clock signal having a third frequency. The control logic may be configured to generate the control signal, based, at least in part, on the second clock signal. The two or more analog to digital converter (ADC) slices may each respective include a multiplexer having a first number of inputs and a second number of outputs, wherein the multiplexer is configured to select a set of the second number of inputs to be output, wherein the set of the second number of inputs selected is based, at least in part, on a control signal, and a second clock generator coupled to the first clock generator, the second clock generator configured to generate one or more fourth clock signals based, at least in part, on the first clock signal, each of the one or more fourth clock signals having a second frequency. Each ADC slice may further include one or more unit-ADCs coupled to the second clock generator, each unit-ADC configured to receive a respective fourth clock signal of the one or more fourth clock signals, and wherein the respective outputs of the one or more unit-ADCs are coupled to the multiplexer as an input. The retimer may be coupled to the output of the multiplexer, wherein the retimer is configured to combine data output by each respective multiplexer of the each of the two or more ADC slices, and output combined data aligned with the second clock. The system may further include a digital signal processor (DSP) coupled to the retimer and configured to receive the combined data, the digital signal processor configured to operate based on the second clock.

In the following description, for the purposes of explanation, numerous details are set forth to provide a thorough understanding of the described embodiments. It will be apparent to one skilled in the art, however, that other embodiments may be practiced without some of these details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

When an element is referred to herein as being "connected" or "coupled" to another element (which includes mechanically, electrically, or communicatively connecting or coupling), it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

When an element is referred to herein as being "disposed" in some manner relative to another element (e.g., disposed on, disposed between, disposed under, disposed adjacent to, or disposed in some other relative manner), it is to be understood that the elements can be directly disposed relative to the other element (e.g., disposed directly on another element), or have intervening elements present between the elements. In contrast, when an element is referred to as being "disposed directly" relative to another element, it should be understood that no intervening elements are present in the "direct" example. However, the existence of a direct disposition does not exclude other examples in which intervening elements may be present.

Moreover, the terms left, right, front, back, top, bottom, forward, reverse, clockwise and counterclockwise are used for purposes of explanation only and are not limited to any fixed direction or orientation. Rather, they are used merely to indicate relative locations and/or directions between various parts of an object and/or components.

Furthermore, the methods and processes described herein may be described in a particular order for ease of description. However, it should be understood that, unless the context dictates otherwise, intervening processes may take place before and/or after any portion of the described process, and further various procedures may be reordered, added, and/or omitted in accordance with various embodiments.

Unless otherwise indicated, all numbers used herein to express quantities, dimensions, and so forth should be understood as being modified in all instances by the term "about." In this application, the use of the singular includes the plural unless specifically stated otherwise, and use of the terms "and" and "or" means "and/or" unless otherwise indicated. Moreover, the use of the terms "including" and "having," as well as other forms, such as "includes," "included," "has," "have," and "had," should be considered non-exclusive. Also, terms such as "element" or "component" encompass both elements and components comprising one unit and elements and components that comprise more than one unit, unless specifically stated otherwise.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

TI SAR ADCs rely on multiple interleaved sub-ADCs, each sub-ADC including a respective plurality of unit-ADCs. The ADC sends out a multi-way interleaved data signal as well as a clock signal to the DSP. Conventionally the DSP clock runs at the rate the same as a sub-ADC sampling clock. However, this leads to sub-optimal designs for either DSP or ADC, as each has its own respective optimal operating frequency.

Unit-ADC clock rate is determined by Fs/N, where Fs is the sampling frequency of the ADC/receiver and N is the ADC interleaving factor. A larger N helps to reduce the ADC power, but increases the power from the previous driving stages. Similarly, a smaller N reduces the driving stage power but increases the ADC power. Therefore, N has an optimal value to achieve the best receiver power efficiency for a specific design and must be chosen carefully. This, however, may vary greatly from an optimal DSP operating clock. A faster clock helps to reduce the data latency, which is critical to the clock-data-recovery (CDR) performance, but this may lead to greater power consumption due to tightened timing requirements. A slower clock reduces the power consumption, but at the cost of CDR performance.

Therefore, a gearbox retiming architecture is proposed to synchronize the ADC and DSP clock rates. Some existing DSP cores integrate a simplified gearbox to solve the ADC/DSP optimal clock rate mismatch problem. A simple gearbox typically utilizes an integer rate conversion between the ADC and the DSP. For example, the ADC data rate is divided by 2 in the DSP. Thus, conventional approaches are limited in their application and scalability. In addition, the dedicated gearbox causes additional data latency, which degrades the CDR performance. Moreover, due to the structure and timing complexity, a dedicated gearbox structure usually causes considerable power and area overhead.

Therefore, a low latency, low power gearbox architecture with flexible conversion rate is set forth below.

FIG. 1 is a schematic block diagram of a DSP system 100 with a gearbox retimer, in accordance with various embodiments. The system 100 includes an ADC 105, which further includes one or more ADC slices 105a-105n. Each ADC slice includes a respective retimer 110a (collectively "retimer 110"). The system 100 further includes digital signal processor (DSP) DSP 115, clock circuit 120, and filter/amplifier 125. It should be noted that the various elements of the system 100 are schematically illustrated in FIG. 1, and that modifications to the various components and other arrangements of the system 100 may be possible and in accordance with the various embodiments.

In various embodiments, the ADC 105 may be a TI SAR ADC, utilizing a time-interleaved architecture, in which the ADC 105 includes one or more ADC slices 105a-105m, including a first ADC slice 105a through an m-th ADC slice 105m, where "m" is an integer. Each ADC slice 105a-105m may include one or more unit-ADCs, respectively. In some examples, each slice may include an n-number of unit-ADCs, where "n" is an integer. Thus, in some embodiments, the TI-ADC may be referred to as an m×n two level TI-ADC, with an m-number of ADC slices, and an n-number of unit-ADCs. For purposes of explanation, the embodiments below may make reference to an example implementation of a 16×7 two level TI-ADC, capable of running at a rate of 112 giga-samples per second (GS/s). Accordingly, an ADC "slice," as used herein, refers to a group of one or more unit-ADCs that processes a "slice" of an input signal. Accordingly, the ADC "slice" may alternatively be referred to as a "channel" of the ADC, or a sub-ADC in a TI architecture. In a TI-ADC, such as ADC 105, each individual ADC slice 105a-105m may also be referred to as a "first level" ADC, which further includes one or more unit-ADCs, respectively.

Furthermore, for purposes of explanation, components of each ADC slice 105a-105n may be described in relation to the first ADC slice 105a. However, it is to be understood that components may be shared between one or more ADC slices 105a-105n, and/or all ADC slices 105a-105n. Accordingly, in some embodiments, the first ADC slice 105a includes a respective retimer 110a. The outputs of the one or more unit-ADCs of the first ADC slice 105a may be coupled to retimer 110a for alignment (e.g., retiming), the output of which is provided to the DSP 115. In various examples, the DSP 115 may be part of a SerDes chip and/or other application, and may, at least in part, be implemented in software, hardware, or a combination of software and hardware.

An input signal may be received by the system 100, and passed through filter/amplifier 125 circuits. In some examples, the analog input may be filtered utilizing a continuous-time linear equalizer (CTLE) filter and passed through a programmable gain amplifier (PGA) before being passed to the ADC 105. It is to be understood that the filter/amplifier 125 circuits are not limited to any specific filter and/or amplifier design, and that in other embodiments, other types of filters and/or amplifiers may be utilized.

In various embodiments, a clock signal may be generated via the clock circuit 120. The clock circuit 120 may include all or part of a clock and data recovery (CDR) system, and one or more clock generators. The clock circuit 120 may be configured to receive a global clock signal and generate subsequent clock signals for use by respective unit-ADCs and the DSP 115. For example, in some embodiments, the global clock signal may be a 7 gigahertz (GHz) clock (corresponding to the number of slices within the ADC, continuing with the example of the 112G TI-ADC architecture featuring 16 slices).

The clock circuit 120 may include a clock divider configured to divide the global clock signal into an m-number of divided clocks corresponding to a respective channel (e.g., respective ADC slice 105a-105m) of the ADC 105. For example, each first level ADC (e.g., each ADC slice 105a-105m) may include seven unit-ADCs. Accordingly, each first level ADC may run at a respective divided clock (e.g., a phase-shifted global clock) at a rate of 7 GS/s and each unit-ADC (e.g., a second level) may be configured to run at a rate of 1 GS/s. The clock circuit 120, accordingly, may further include a clock generator (referred to hereinafter as the "gearbox clock generator"), to generate a first clock signal for the unit-ADCs based on the divided clock, and a second clock signal for the retimer 110 and/or DSP 115. For example, in some embodiments, a 1 GHz clock may be generated for the unit-ADCs, and a 1.4 GHz clock for the retimer 110 and/or DSP 115. In yet further examples, the first clock signal may be referred to as a "token" clock signal configured to be used by a respective successive approximation register (SAR) clock generator, which may generate seven respective phase-shifted 1 GHz signals for each respective unit-ADC of a respective ADC slice 105a-105n, based, at least in part, on the respective divided clock corresponding to the ADC slice, and the first clock signal. Accordingly, as used herein, "phase-shifted" may refer to a signal in which the phase of the signal has been shifted relative to an original signal.

Accordingly, in some examples, the 1 GHz clock signal (e.g., 1G token clock signal) generated by the clock divider may be referred to as a "first" clock signal, the 1.4 GHz clock (e.g., a retimer clock) may be referred to as a "second" clock signal. The 7 GHz clock signal (e.g., the global clock signal) on which the first and second clock signals are generated may be referred to as the "third" clock signal. The respectively phase-shifted 1 GHz clock signals (e.g., generated by the SAR clock generator for use by respective unit-ADCs), may be referred to as the one or more "fourth" clock signals.

In some examples, the first clock signal may further be described as having a first frequency (e.g., 1 GHz), the second clock signal as having a second frequency (e.g., 1.4 GHz), and the third clock signal as having a third frequency (e.g., 7 GHz). Similarly, in some examples, the clock divider may be referred to as a "first" clock generator, and the SAR clock generator may be referred to as a "second" clock generator.

It is to be understood that each of the first, second, third, and fourth clock signals are assigned numberings arbitrarily, and that in other embodiments, other numberings may be used to refer to the various clock signals. Thus, the numbering of clock signals is used merely as a label for purposes of differentiation between different clock signals, and the numbering does not imply an order, sequence, or relationship between clock signals beyond what is set forth in the descriptions above, and as set forth in the embodiments below. Similarly, the numbering of the frequencies and clock generators is used merely for purposes of differentiation, and in other embodiments, other numberings or labels may be applied to differentiate between the respective frequencies of the clock signals, and to differentiate between the clock divider and SAR clock generator (or other additional clock generators).

The functions of the clock circuit 120 and retimer 110 are described in greater detail below with respect to FIG. 2.

Figure 2:
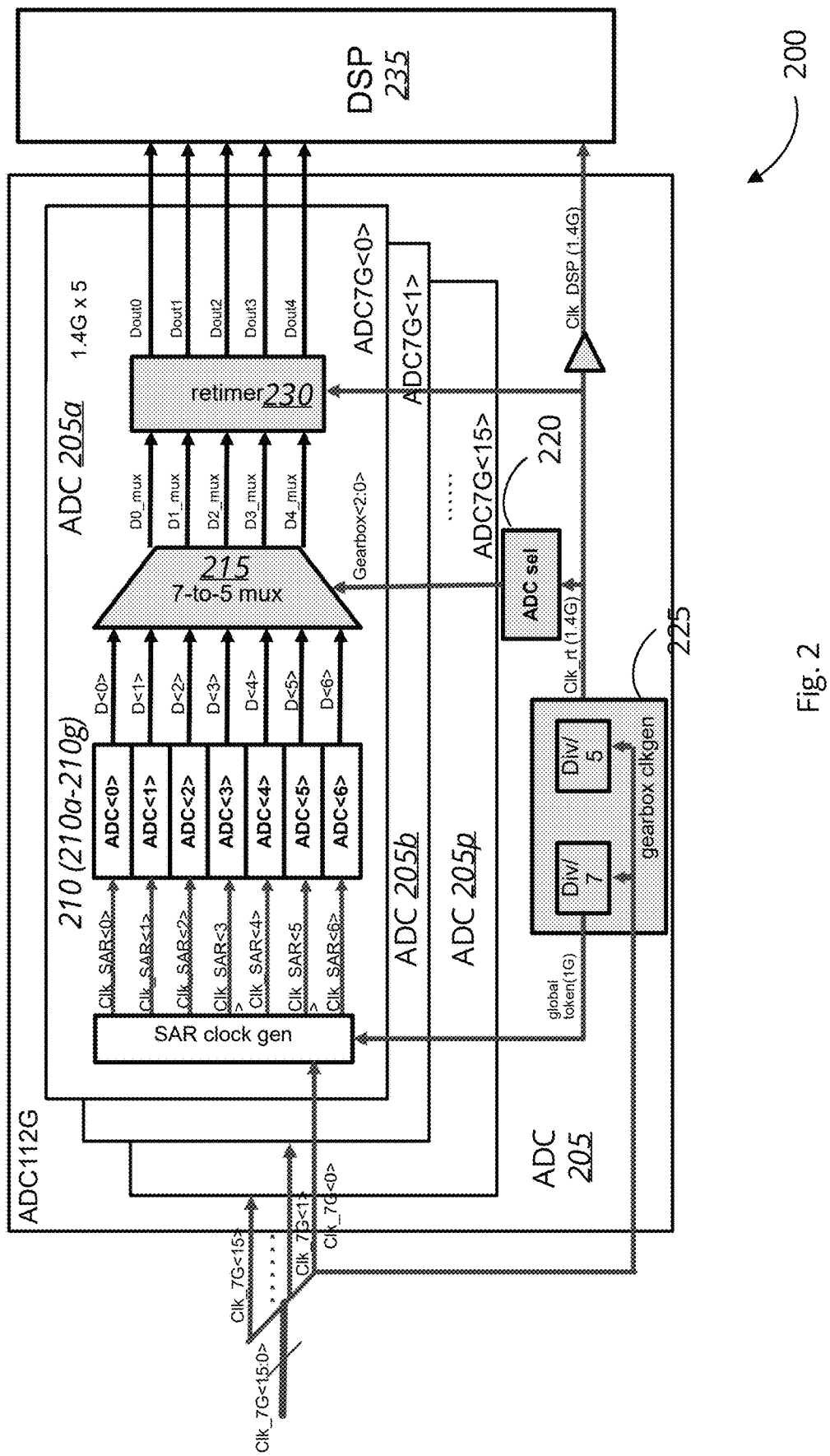
FIG. 2 is a schematic diagram of a TI-ADC architecture with a gearbox retimer, in accordance with various embodiments.

FIG. 2 is a schematic diagram of a TI-ADC architecture 200 with a gearbox retimer circuit, in accordance with various embodiments. FIG. 2 depicts an ADC 205 including ADC slices 205a-205p, and each of the ADC slices 205a-205p includes one or more unit-ADCs 210a-210g (collectively "unit-ADCs 210"), multiplexer 215, and retimer 230. The ADC 205 may further include ADC selection logic 220, clock generator 225, and DSP 235. It should be noted that the various elements of the ADC 200 are schematically illustrated in FIG. 2, and that modifications to the various components and other arrangements of the ADC 200 may be possible and in accordance with the various embodiments.

As previously described, in various embodiments, the ADC 205 may be a 16×7 TI-ADC. As such, the ADC 205 includes sixteen ADC slices 205-205p, and each slice further including seven unit-ADCs (210a-210g). The output of the unit-ADCs 210a-210g may be coupled to multiplexer 215

In various embodiments, the multiplexer 215 may be configured to select one or more outputs of the unit-ADCs 210. For example, in some embodiments, the multiplexer 215 may be a 7-to-5 multiplexer, in which five of the seven respective outputs of each of the unit-ADCs 210a-210g are selected to be output to the retimer 230 based on a control signal. The control signal, in various embodiments, may be provided via the ADC selection logic 220. The ADC selection logic 220 may be configured to generate a code (e.g., a 3-bit code for selection the various combinations of the outputs of five sequential unit-ADCs). In some examples, the ADC selection logic 220 may be a finite-state-machine driven by a clock signal, such as the 7 GHz global clock (or a divided clock as described below), rotating between six codes (e.g., 000 (0) through 110 (6)).

In this way, the multiplexer 215 may be controlled via the ADC selection logic 220. Thus, ADC selection logic 220 may, in various examples, be referred to as "control logic." In various examples, the control logic may be a global component, in which a global control signal is generated for each respective multiplexer of the one or more ADC slices 205a-205p by the ADC selection logic 220. Control of the multiplexer 215 and operation of the ADC selection logic 220 is described in greater detail below with respect to FIG. 3. As used herein, logic may refer to logic implemented in hardware (e.g., a logic circuit, programmable logic, etc.), software, and/or hardware and software.

Accordingly, in some embodiments, the outputs of each unit-ADC 210 of each of the ADC slices 205a-205p may be provided to the retimer 230. The retimer 230, accordingly, may combine and realign (e.g., retiming) the outputs of the outputs of the one or more unit-ADCs 210 of each of the ADC slices 205a-205p. Accordingly, as used herein, a "retimer" refers to a device which takes the outputs of the unit-ADCs and generates a new output and new clock signal based on the outputs. A "retimer circuit" may include the retimer, and further include one or more clock generators, such as clock generator 225, a CDR circuit, and other components used to generate the combined output (e.g., combined data) and a recovered clock signal to the DSP 235.

In various embodiments, each ADC slice 205a-205p may receive a respective first level clock signal (Clk_7G<15:0>). In some examples, the first level clock signal may be generated by a clock generator. A clock generator, as used herein, refers to a circuit and/or device (e.g., an oscillator) which generates a clock signal.

The clock generator 225 may utilize a respective first level clock signal to generate one or more clock signals for a respective slice. In various examples, the clock generator 225 may include one or more dividers. In some embodiments, the cock generator 225 may include a first divider configured to divide the first level clock signal by 7 (e.g., a divide-by-7 divider circuit configured to divide a clock frequency by 7), and a second divider configured to divide the first level clock signal by 5 (e.g., a divide-by-5 divider circuit configured to divide a clock frequency by 5). As previously described, the first-level clock signal may be a 7 GHz clock signal. Therefore, the first divider may generate a 1 GHz clock signal to be provided to the unit-ADCs 210, and the second divider may generate a 1.4 GHz clock signal provided to the ADC selection logic 220 and/or DSP 235. Thus, in various embodiments, by utilizing a clock generator 225 comprising two or more clock dividers, a first respective clock signal may be generated for unit-ADCs 210, and a second respective clock signal may be generated for the retimer 230, ADC selection logic 220, and/or DSP 235.

Accordingly, in various embodiments, the one or more ADC slices 205a-205p run at 7 Gs/s and each unit-ADC 210a-210g (of each respective ADC slice 205a-205p) runs at 1 Gs/s. The retimer 230, thus, receives 112-way 1 GHz ADC data and converts the 112 outputs into 80-way aligned 1.4 GHz data (e.g., combined data). In this way, in some embodiments, the unit-ADCs 210 and the DSP 230 are able to run at their own optimal frequency, (e.g., 1 GHz and 1.4 GHz respectively).

Figure 3:
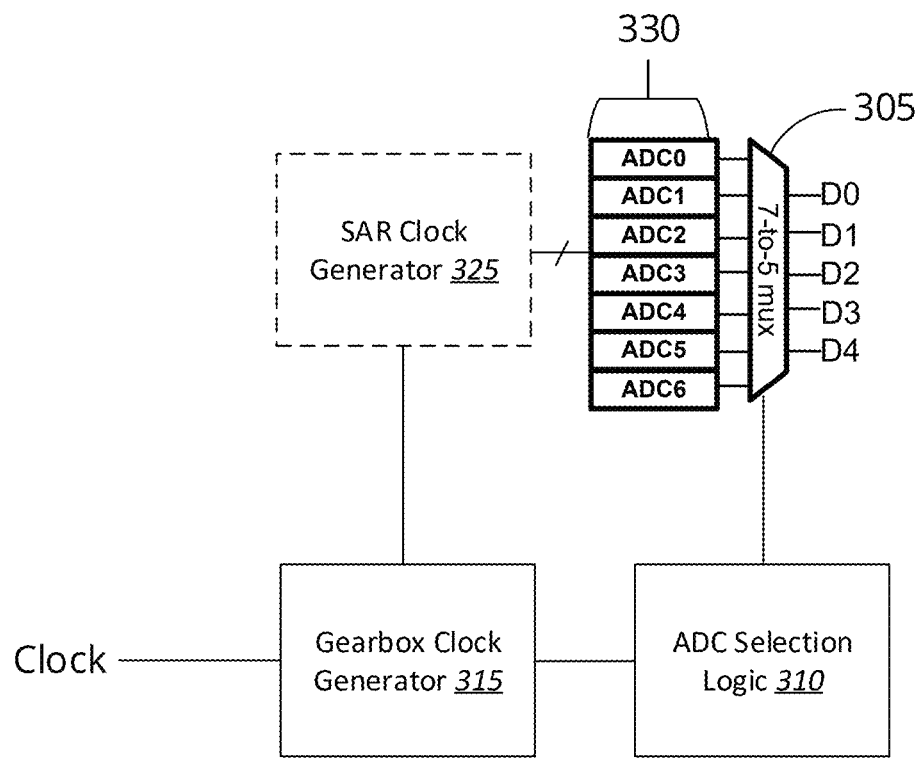
FIG. 3 is a schematic diagram of a gearbox retimer subcircuit for a set of unit-ADCs, in accordance with various embodiments.

FIG. 3 is a schematic diagram of a gearbox retimer subcircuit 300 for a set of unit-ADC, in accordance with various embodiments. The subcircuit 300 includes multiplexer 305, ADC selection logic 310, gearbox clock generator 315, SAR clock generator 325, and unit-ADCs 330. It should be noted that the various elements of the subcircuit 300 are schematically illustrated in FIG. 3, and that modifications to the various components and other arrangements of the subcircuit 300 may be possible and in accordance with the various embodiments.

As previously described, in some examples, each ADC slice (e.g., first-level ADC) may receive a respective 7 GHz clock. In some examples, the ADC may be a 16×7 112G ADC. Accordingly, a total of sixteen 7 GHz clocks, each having a respective phase (e.g., phase-shifted relative to an input clock, each having a different phase). The 7 GHz clock signal, labeled "clock" may be received by the gearbox clock generator 315.

The gearbox clock generator 315 may take the 7 GHz clock signal, and generate two additional clock signals, a 1 GHz clock signal for use by the unit-ADCs 330, and a 1.4 GHz clock signal, for use by a retimer (as previously described). takes the 7G clocks and generates the 1 GHz clocks for unit-ADCs and a 1.4 GHz clock for the gearbox retimer. Each unit-ADC 330 output is triggered by a respective 1 GHz clock, each 1 GHz clock being shifted in phase from the 7 GHz clock signal (e.g., the clock signal for the respective ADC slice). Accordingly, each unit-ADC of the unit-ADCs 330 may operate (e.g., sample) at a rate of 1 GS/s.

In some examples, the respective 1 GHz clock signals provided to the unit-ADCs 330 may be generated by the SAR clock generator 325. For example, the SAR clock generator 325 may receive a 1 GHz clock signal from the gearbox clock generator 315, and the seven phase-shifted 1 GHz clock signals may be generated for each of the seven unit-ADCs 330 based, at least in part, on the 1 GHz clock signal from the gearbox clock generator 315.

Each ADC slice may further include a multiplexer 305 and a retimer (not shown). In this example, the multiplexer 305 may be a 7-to-5 multiplexer. The 7-to-5 multiplexer 305 may be configured to select five out of the seven unit-ADCs 330, and send the data from the selected unit-ADCs to the retimer. In various examples, the ratio of the number of inputs to the number of outputs of the multiplexer 305 may be determined based, at least in part, on an operating frequency of each of the unit-ADCs. In some further examples, the ratio of inputs to outputs of the multiplexer 305 may be further based, at least in part, on an operating frequency of a DSP. In the example above, seven unit-ADCs 330 are utilized, each with an operating frequency of 1 GHz, and the DSP may run at an operating frequency of 1 GHz. Accordingly, a 7-to-5 multiplexer 305 may be utilized, which corresponds to the ratio of the respective operating frequencies, 1.4 GHz to 1 GHz.

The selection of ADC outputs may, in various examples, be controlled by ADC selection logic 310, which may output a control signal (e.g., gearbox<2:0> in FIG. 2). In various examples, the ADC selection logic 310 may be a finite-state-machine (FSM) having a number of states corresponding to the control signal being output, wherein the total number of states further corresponds to the total number of unit-ADCs (or set of unit-ADCs to be selected). In some examples, the FSM state change may be driven by a 1.4 GHz clock. Thus, the ADC selection logic 310 may cycle through various stated at a rate of 1.4 GHz. Put another way, the control signal may change through its values (0-6)/states each cycle of the 1.4 GHz clock. In other examples, the ADC selection logic 310 may be driven by the 7 GHz clock.

Accordingly, in some examples, ADC selection logic 310 may be configured to output a digital control signal, gearbox<2:0> (e.g., a 3-bit control signal), and thus cycle (e.g., change) through values 0-6 corresponding to each respective set of sub-ADCs to be selected.

An example of ADC selection is given in Table 1 below:

TABLE 1

Example Mapping of Gearbox<2:0> to Unit-ADCs

| Gearbox<2:0>, (value) | Selected Unit-ADCs |
|---|---|
| 000, (0) | ADC<0, 1, 2, 3, 4> |
| 001, (1) | ADC<5, 6, 0, 1, 2> |
| 010, (2) | ADC<3, 4, 5, 6, 0> |
| 011, (3) | ADC<1, 2, 3, 4, 5> |
| 100, (4) | ADC<6, 0, 1, 2, 3> |
| 101, (5) | ADC<4, 5, 6, 0, 1> |
| 110, (6) | ADC<2, 3, 4, 5, 6> |

Figure 4:
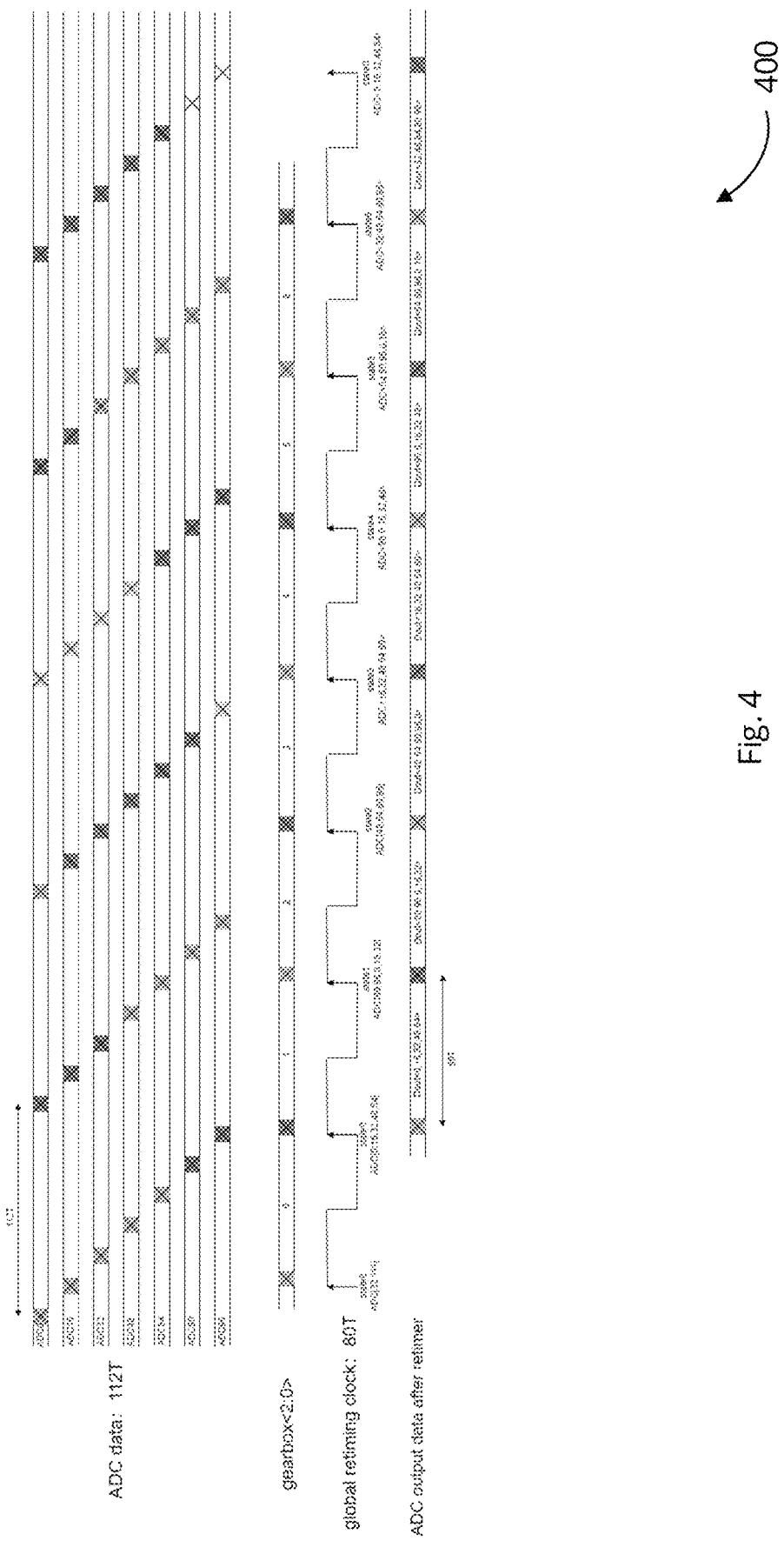
FIG. 4 is a timing diagram of signals in the TI-ADC with gearbox retimer, in accordance with various embodiments.

FIG. 4 is a timing diagram of signals 400 in the TI-ADC with gearbox retimer. Specifically, the timing relationship between the outputs of the sub-ADCs (of all ADC slices) and gearbox retimer clocks (e.g., 1.4 GHz clock), and retimer output data. Continuing with the examples above, each sub-ADC is triggered by its respective clock (e.g., 1 GHz clock). The ADC selection logic may generate a control signal (also referred to as the "gearbox signal," or gearbox<2:0>), which may cycle 0 to 6 to select the corresponding sub-ADCs. The 1.4 GHz clock (also referred to as a "retiming clock") may be configured to retime each selected sub-ADC's data, and generate output data at 1.4 GHz. Accordingly, the data (output at 1.4 GHz) and the 1.4 GHz clock may be sent to the DSP.

Figure 5:
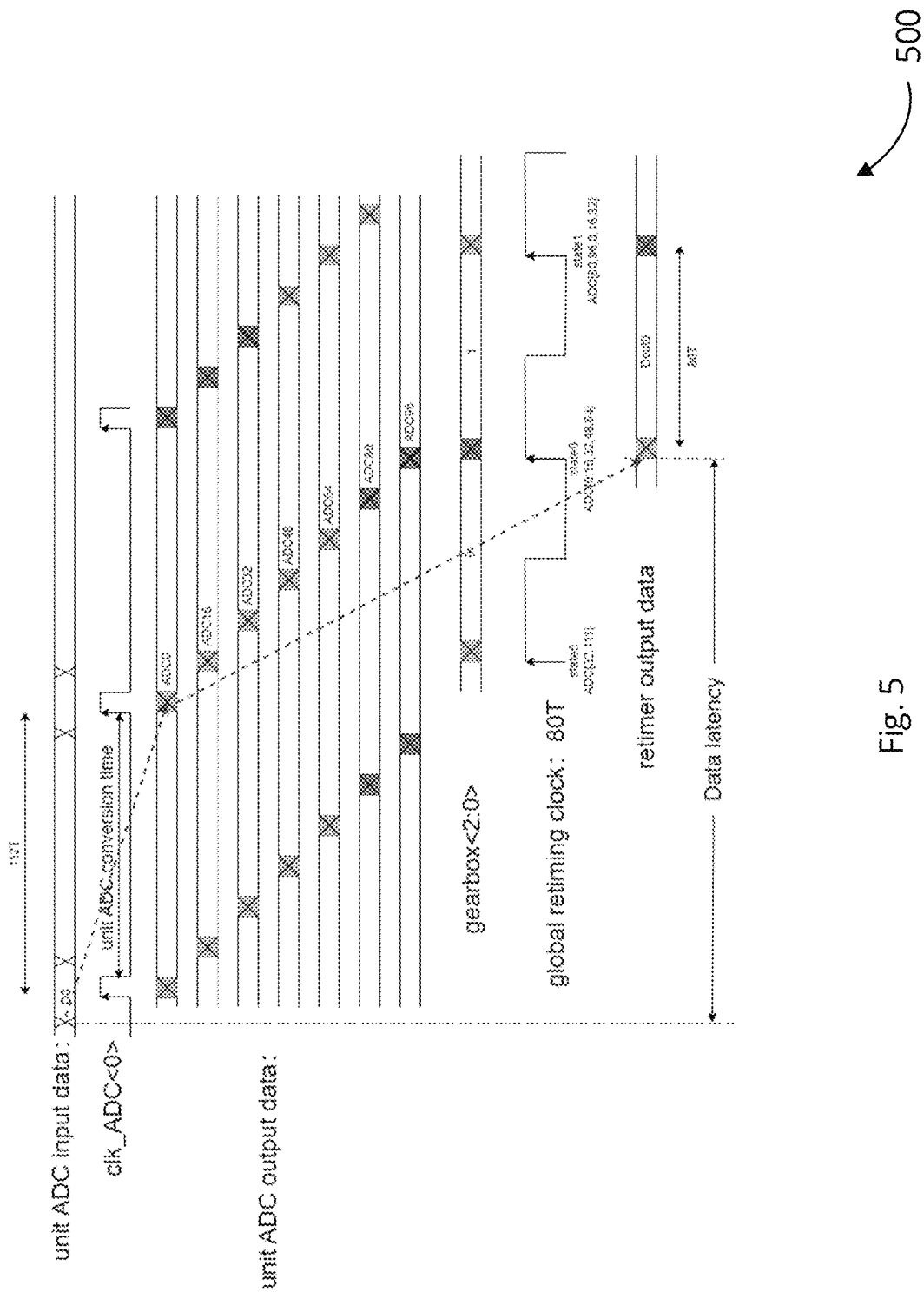
FIG. 5 is a timing diagram showing data latency between the sub-ADC output and gearbox retimer output, in accordance with various embodiments.

FIG. 5 is a timing diagram of signals 500 showing data latency between the sub-ADC output (e.g., an input signal to the multiplexer/retimer) and an output of the retimer. In the depicted example, a period of 1 unit interval may be defined as "1T." The unit-ADC conversion cycle may be given by 112T, whereas the DSP clock cycle may be given as 80T.

In various examples, based on the architecture depicted in FIGS. 1-3, the data latency may be determined based on the unit-ADC conversion time (112T), a DSP clock cycle (80T), and a retimer setup time margin (approximately 20T). Therefore, the total latency may be given as approximately 212T. In comparison, a traditional retimer cascaded with a dedicated integer conversion ratio (2:1) may exhibit a total latency of approximately 420T. With a conventional 2:1 conversion ratio, unit-ADC conversion time is typically 160T, retimer latency 160T, setup margin time 20T, and gearbox latency 80T. Accordingly, based on the above examples, with the proposed architecture, data latency reduction of nearly 50% can be achieved.

While some features and aspects have been described with respect to the embodiments, one skilled in the art will recognize that numerous modifications are possible. For example, while various methods and processes described herein may be described with respect to particular structural and/or functional components for ease of description, methods provided by various embodiments are not limited to any particular structural and/or functional architecture but instead can be implemented in any suitable hardware configuration. Similarly, while some functionality is ascribed to one or more system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with or without some features for ease of description and to illustrate aspects of those embodiments, the various components and/or features described herein with respect to a particular embodiment can be substituted, added and/or subtracted from among other described embodiments, unless the context dictates otherwise. Consequently, although several embodiments are described above, it will be appreciated that the invention is intended to cover all modifications and equivalents within the scope of the following claims.

What is claimed is:

1. An apparatus comprising:
 a first clock generator configured to generate a first clock signal having a first frequency, and a second clock signal having a second frequency, wherein the first clock signal and second clock signal are generated based on a third clock signal having a third frequency;
 a control logic configured to generate a control signal, based, at least in part, on the second clock signal;
 two or more analog to digital converter (ADC) slices, each respective ADC slice comprising:
  a multiplexer having a first number of inputs and a second number of outputs, wherein the multiplexer is configured to select a set of the second number of inputs to be output, wherein the set of the second number of inputs selected is based, at least in part, on the control signal;
  a second clock generator coupled to the first clock generator, the second clock generator configured to generate one or more fourth clock signals based, at least in part, on the first clock signal, each of the one or more fourth clock signals having the first frequency;

one or more unit-ADCs coupled to the second clock generator, each unit-ADC configured to receive a respective fourth clock signal of the one or more fourth clock signals, and wherein the respective outputs of the one or more unit-ADCs are coupled to the multiplexer as an input.

2. The apparatus of claim 1, wherein the second frequency is different from the third frequency.

3. The apparatus of claim 1, wherein the first clock generator includes a first clock divider and a second clock divider, wherein the first clock divider is configured to divide the third frequency of the third clock signal by the first number and generate the first clock signal having the first frequency, wherein the first frequency is the third frequency divided by the first number, and wherein the second clock divider is configured to divide the third frequency of the third clock signal by the second number and generate the second clock signal having the second frequency, wherein the second frequency is the third frequency divided by the second number.

4. The apparatus of claim 1, wherein the control logic is a finite-state-machine (FSM) having the first number of states corresponding to a respective control signal that is output by the control logic.

5. The apparatus of claim 1, further comprising a retimer, wherein the output of the multiplexer is coupled to the retimer, wherein the retimer is configured to combine data output by each respective multiplexer of the each of the two or more ADC slices, and output combined data to a digital signal processor (DSP).

6. The apparatus of claim 1, wherein a ratio of the first number of inputs to the second number of outputs of the multiplexer is based, at least in part, on a ratio of the first frequency of the first clock signal to the second frequency of the second clock signal.

7. The apparatus of claim 4, wherein the control signal is a digital code, wherein the value of the digital code corresponds to one of a set of the first number of values.

8. The apparatus of claim 7, wherein the value of the digital code changes through each value of the set of the first number of values based, at least in part, on the second clock signal.

9. The apparatus of claim 8, wherein the multiplexer is a 7-to-5 multiplexer, wherein the first number of inputs is 7, and the second number of outputs is 5.

10. The apparatus of claim 9, wherein the first frequency of the first clock signal is 1 gigahertz, wherein the second frequency of the second clock signal is 1.4 gigahertz.

11. A circuit comprising:
a clock generator configured to generate a first clock signal having a first frequency, and a second clock signal having a second frequency, wherein the first clock signal and second clock signal are generated based on a third clock signal having a third frequency;
a multiplexer having a first number of inputs and a second number of outputs, wherein the multiplexer is configured to select a set of the second number of inputs to be output, wherein the set of the second number of inputs selected is based, at least in part, on a control signal; and
a control logic configured to generate the control signal, based, at least in part, on the second clock signal; and
one or more unit-ADCs, each unit-ADC configured to receive a respective fourth clock signal of one or more fourth clock signals, wherein the one or more fourth clock signals are generated based, at least in part, on the first clock signal, and wherein the respective outputs of the one or more unit-ADCs are coupled to the multiplexer as an input.

12. The circuit of claim 11, wherein the second frequency is different from the third frequency.

13. The circuit of claim 11, wherein the first clock generator includes a first clock divider and a second clock divider, wherein the first clock divider is configured to divide the third frequency of the third clock signal by the first number and generate the first clock signal having the first frequency, wherein the first frequency is the third frequency divided by the first number, and wherein the second clock divider is configured to divide the third frequency of the third clock signal by the second number and generate the second clock signal having the second frequency, wherein the second frequency is the third frequency divided by the second number.

14. The circuit of claim 11, wherein the control logic is a finite-state-machine (FSM) having the first number of states corresponding to a respective control signal that is output by the control logic, wherein the control signal is a digital code, wherein the value of the digital code corresponds to one of a set of the first number of values.

15. The circuit of claim 11, wherein a ratio of the first number of inputs to the second number of outputs of the multiplexer is based, at least in part, on a ratio of the first frequency of the first clock signal to the second frequency of the second clock signal.

16. A system comprising:
an analog to digital converter (ADC) further comprising:
a first clock generator configured to generate a first clock signal having a first frequency, and a second clock signal having a second frequency, wherein the first clock signal and second clock signal are generated based on a third clock signal having a third frequency;
a control logic configured to generate a control signal, based, at least in part, on the second clock signal;
two or more analog to digital converter (ADC) slices, each respective ADC slice comprising:
a multiplexer having a first number of inputs and a second number of outputs, wherein the multiplexer is configured to select a set of the second number of inputs to be output, wherein the set of the second number of inputs selected is based, at least in part, on the control signal;
a second clock generator coupled to the first clock generator, the second clock generator configured to generate one or more fourth clock signals based, at least in part, on the first clock signal, each of the one or more fourth clock signals having the first frequency;
one or more unit-ADCs coupled to the second clock generator, each unit-ADC configured to receive a respective fourth clock signal of the one or more fourth clock signals, and wherein the respective outputs of the one or more unit-ADCs are coupled to the multiplexer as an input; and
a retimer coupled to the output of the multiplexer, wherein the retimer is configured to combine data output by each respective multiplexer of the each of the two or more ADC slices, and output combined data aligned with the second clock;

a digital signal processor (DSP) coupled to the retimer and configured to receive the combined data, the digital signal processor configured to operate based on the second clock.

17. The system of claim 16, wherein the first clock generator includes a first clock divider and a second clock divider, wherein the first clock divider is configured to divide the third frequency of the third clock signal by the first number and generate the first clock signal having the first frequency, wherein the first frequency is the third frequency divided by the first number; and wherein the second clock divider is configured to divide the third frequency of the third clock signal by the second number and generate the second clock signal having the second frequency, wherein the second frequency is the third frequency divided by the second number.

18. The system of claim 16, wherein the control logic is a finite-state-machine (FSM) having the first number of states corresponding to a respective control signal that is output by the control logic, wherein the control signal is a digital code, wherein the value of the digital code corresponds to one of a set of the first number of values.

19. The system of claim 16, wherein a ratio of the first number of inputs to the second number of outputs of the multiplexer is based, at least in part, on a ratio of the first frequency of the first clock signal to the second frequency of the second clock signal.

20. The system of claim 18, wherein the value of the digital code changes through each value of the set of the first number of values based, at least in part, on the second clock signal.

* * * * *